May 26, 1936. L. M. STUART 2,042,280

MOVEMENT CHECKING MECHANISM

Filed Dec. 3, 1931 3 Sheets-Sheet 1

INVENTOR
*Lemuel M. Stuart*
BY
*Moakley & Gill*
ATTORNEYS

May 26, 1936.  L. M. STUART  2,042,280
MOVEMENT CHECKING MECHANISM
Filed Dec. 3, 1931  3 Sheets—Sheet 2
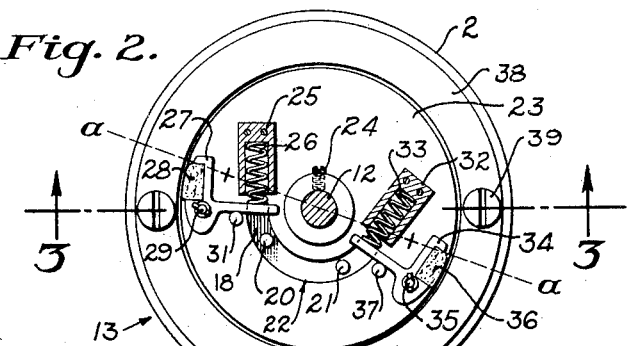
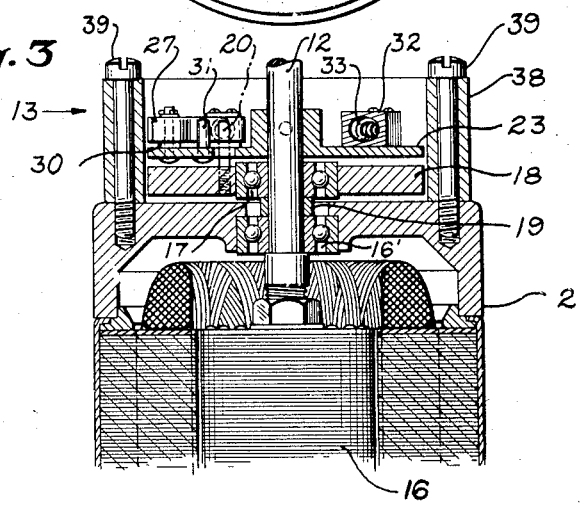
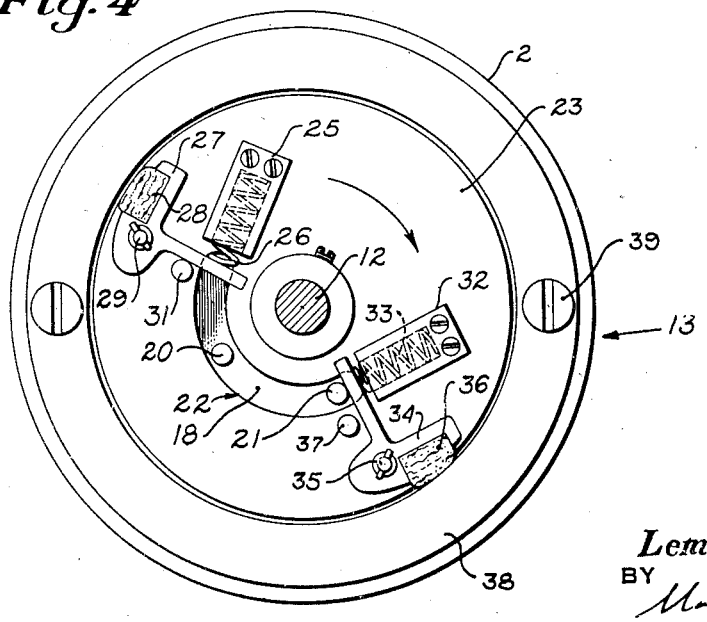
INVENTOR
*Lemuel M. Stuart*
BY
ATTORNEYS

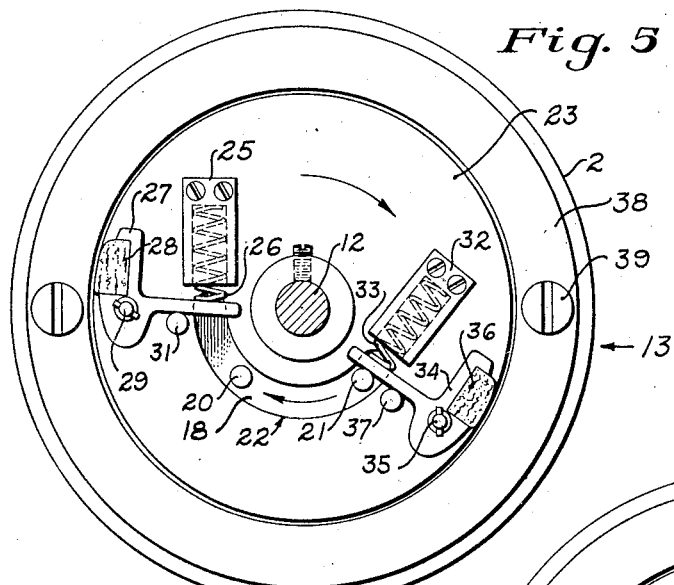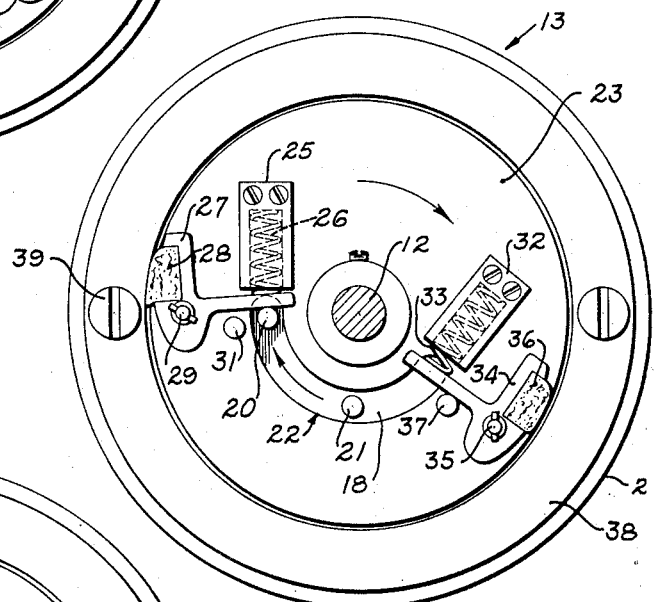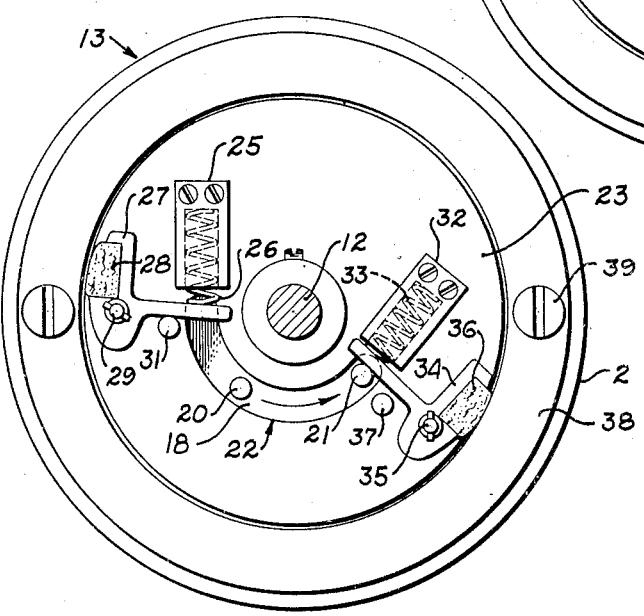

Patented May 26, 1936

2,042,280

UNITED STATES PATENT OFFICE 2,042,280

MOVEMENT CHECKING MECHANISM

Lemuel M. Stuart, Brooklyn, N. Y., assignor to Ford Instrument Company, Inc., Long Island City, N. Y., a corporation of New York Application December 3, 1931, Serial No. 578,839

14 Claims. (Cl. 177—327)

This invention relates to mechanism for checking the movement of elements upon a change in the speed of said elements and more particularly to movement checking mechanism for use in machines and systems wherein one element moves in accordance with the movement of another element, or wherein the direction of movement of an element is rapidly changed, or wherein an element must end its movement suddenly at a particular place.

While the invention is of general utility, it will for purposes of illustration, be shown herein in connection with a signalling system of the Selsyn type.

A simple form of Selsyn system comprises a transmitter or generator and a receiver or motor, both of which are miniature polyphase alternators, the rotors of both generator and motor being supplied with single phase current and the stator winding of the generator being connected at certain points with corresponding points in the stator winding of the receiver motor. The operation of the transmitter and receiver is, however, entirely different from that of alternators and resembles the operation of transformers and induction regulators.

The current in the transmitter rotors causes different voltages to be set up at the connecting points in the transmitter winding. The values of these voltages are dependent upon the exact position of the rotor relative to the stator winding and may be changed by turning the rotor. When the rotor of the receiver is in a position corresponding to that of the transmitter the same voltages are set up at the connecting points of the stator winding of the receiver as at the corresponding points of the stator winding of the transmitter. When, however, the transmitter rotor is turned, such voltages are changed at the points in the stator winding of the transmitter causing currents to flow through the connecting conductors and the receiver rotor is turned to a position corresponding to that of the transmitter rotor. The rotor of the receiver moves rapidly to follow the rotor of the transmitter and because of its momentum does not stop abruptly at the new position but oscillates about it before coming to rest. These oscillations are not desirable since the rotor of the receiver is usually connected to a dial or power follow-up mechanism, and to avoid them friction damping devices which apply a more or less constant load to the receiver have been used. These damping devices necessitate the use of over size receivers and interfere with the accuracy of the system without entirely obviating the oscillations of the receiver rotor.

When a Selsyn system is put in operation by closing the energizing circuit thereof, the transmitter and receiver rotors are usually not in corresponding positions with the result that the receiver rotor rotates to align itself with the transmitter rotor. Since the current which causes the rotation of the receiver rotor is equally effective on the transmitter rotor, it also will rotate, unless it is held against movement, and will disturb the settings of the means which normally rotate the transmitter rotor. Such movement is usually prevented by connecting a sufficient load to the transmitter rotor. This load since it is consistently applied necessitates the use of a more powerful drive for the transmitter rotor than would be otherwise necessary.

An object of this invention is to provide a movement checking mechanism adapted for use with apparatus of the character specified which is entirely automatic and which puts the checking load on the element whose movement is to be checked during actual checking only and movement checking mechanism which is entirely balanced and hence equally effective in various positions of the element whose movement is to be checked.

The particular nature of the invention as well as other objects and advantages thereof will appear most clearly from a description of preferred embodiments thereof as shown in the drawings, in which:—

Fig. 2 is a top plan view of the receiver with a preferred form of the invention applied thereto, showing the parts of the checking mechanism in the positions they assume when the receiver rotor is stationary;

Fig. 3 is a sectional elevation taken on line 3—3 of Fig. 2;

Figs. 4, 5, 6 and 7 are views similar to Fig. 2 showing the parts of the checking mechanism in the positions they assume when the rotor of the receiver is respectively starting to rotate, rotating at normal speed, reducing its speed and substantially stopped;

Figure 1:
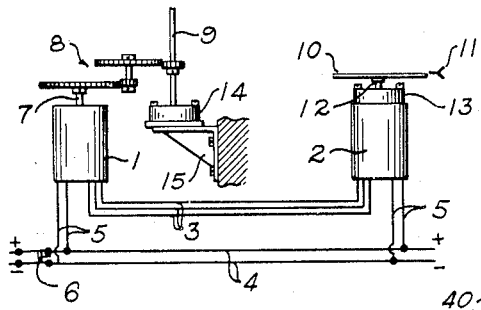
Fig. 1 is a diagrammatic representation of a Selsyn system with one preferred form of the invention applied to the receiver and another preferred form applied to the transmitter drive.
Figure 8:
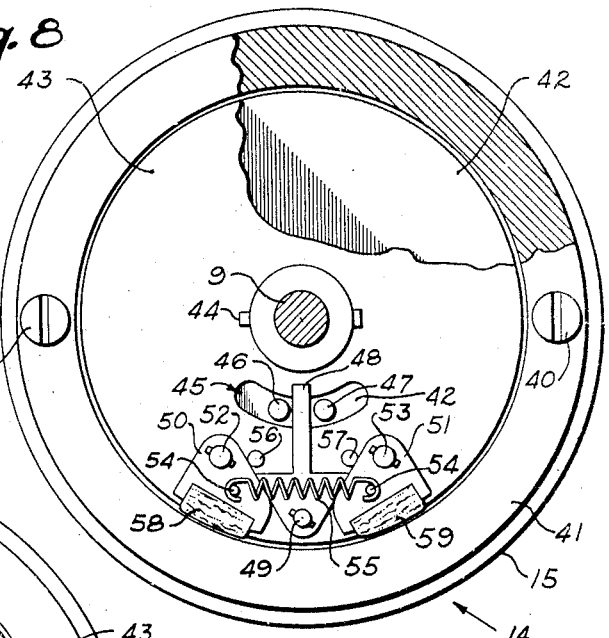
Fig. 8 is a part sectional top plan view of the preferred form of the invention which is applied to the transmitter drive, showing the parts of the checking mechanism in the positions they assume when the transmitter is not being driven.

The Selsyn system shown in Fig. 1 is typical of such systems and comprises a transmitter 1 and a receiver 2. The corresponding stator terminals of transmitter 1 and receiver 2 are connected to each other by conductors 3, the rotor terminals being connected to the D. C. supply line 4 through conductors 5. A switch 6 is provided in supply line 4 for opening and closing the energizing circuits of the stators of transmitter 1 and receiver 2.

The rotor shaft 7 of transmitter 1 carries the last gear of a reducing gear train 8, the first pinion of which is carried by shaft 9. The gear train 8 shown is so proportioned that shaft 7 makes one turn for every fifteen turns of shaft 9. With gear train 8 so proportioned the system is very accurate, however, if a different degree of accuracy is required, gear train 8 may be altered accordingly. Shaft 9 may be driven from a hand crank, not shown, or it may be connected to the output of a computing mechanism or other similar device, also not shown.

As shaft 9 is rotated in accordance with the value of the quantity transmitted over the system, gear train 8 causes a corresponding rotation of rotor shaft 7 with the result that the rotor of transmitter 1 is rotated relative to its stator and there is a current flow through the windings of the rotor of transmitter 1, conductors 3 and the windings of the rotor of receiver 2. Due to this current flow, the rotor of receiver 2 will move relative to its stator to follow the rotation of the rotor of transmitter 1. To indicate the value of the quantity transmitted over the system, a dial 10 which cooperates with a fixed index 11 is secured to the rotor shaft 12 of receiver 2. The rotation of the rotor of receiver 2 is sufficiently rapid to substantially instantaneously follow every movement of the rotor of transmitter 1 as it takes place. At the end of the movement of shaft 7 the rotor of receiver 2 slows down appreciably as it approaches a position relative to its stator which corresponds with the position of the rotor of the transmitter relative to its stator due to the decreasing current flow. However, it does not stop abruptly at the position but oscillates about it. The motion checking mechanism 13, described in detail hereinafter, which is mounted on receiver 2 insures the stopping of the rotor of receiver 2 at the proper position without oscillation. Thus dial 10 will show opposite index 11 the correct value of the quantity transmitted during every instant of the operation of the system.

When switch 6 is closed to put the system into condition for operation, the rotor of the receiver 2 is seldom in a position corresponding to the position of the rotor of the transmitter 1, with the result that there is a current flow through both of the rotors and conductors 3 that is effective to rotate both of said rotors until they assume corresponding positions relative to their stators. To prevent this rotation of the rotor of transmitter 1 which would alter the settings of the computing or similar mechanisms, not shown, to which shaft 9 is connected and to insure the proper value of the quantity transmitted being indicated on dial 10 opposite index 11 the motion checking mechanism 14, described in detail hereinafter, is provided. This mechanism is mounted on a fixed bracket 15 and is connected to the bottom end of shaft 9. Mechanism 14 is operative only at the time mentioned and does not in any way interfere with or influence the normal operation of the system.

Referring particularly to Figs. 2 to 7 inclusive, of the drawings:

The rotor 16 of the Selsyn receiver 2 is provided with shaft 12 which is supported in a ball-bearing 16' and projects beyond the casing of receiver 2. Outside of the casing of receiver 2 shaft 12 has fastened to it the inner race of a ball-bearing 17, the outer race of which is fastened to an inertia disc 18. A spacing washer 19 is provided to space bearing 17 and disc 18 from the casing of receiver 2. Thus, disc 18 is mounted to rotate freely relative to shaft 12.

Pins 20 and 21 are fastened to disc 18 and project through an arcuate slot 22 cut in disc 23. These pins are located at equal distances from the center of disc 18, the spacing between these pins depending on considerations hereinafter set forth. A set screw 24 passes through the hub of disc 23 and serves to secure the disc to shaft 12.

At the end of slot 22 nearest pin 20 is fastened to disc 23, by means of screws, a spring housing 25 in which is located a compression spring 26. The outer end of spring 26 bears against one end of a bell crank lever 27, the other end of which is shaped to accommodate an inset 28 of cork or other friction material. Bell crank lever 27 is pivoted on disc 23 by means of pin 29. A spacing washer 30 serves to space bell crank lever 27 from disc 23. A pin 31 projecting from disc 23 serves to limit the movement of bell crank lever 27 in one direction. At the other end of slot 22 is fastened to disc 23 a spring housing 32 in which is located a compression spring 33 whose outer end bears against one end of bell crank lever 34. Bell crank lever 34 is pivoted on disc 23 by means of a pin 35, a spacing washer, not shown, similar to washer 30, being provided to space bell crank lever 34 from disc 23. The other end of bell crank lever 34 is shaped to accommodate an inset 36 of cork or other friction material. A pin 37 projecting from disc 23 serves to limit the movement of bell crank lever 34 in one direction. A ring 38 fastened to the casing of receiver 2 by threaded studs 39 encircles discs 18 and 23. The inner face of ring 38 cooperates with friction insets 28 and 36 to apply the checking load to shaft 12.

Referring particularly to Fig. 2, the elements carried by disc 23 are so designed that the center of gravity, designated by the + mark, of the group of elements at one end of slot 22 is located at the same distance from the center of disc 23 on the diametrical line, designated a—a, as the center of gravity, also designated by a + mark, of the group at the other end of slot 22. Thus disc 23 is balanced in all positions of the receiver 2.

Referring particularly to Figs. 4 and 5 and assuming that the rotor 16 of receiver 2 starts to rotate in the direction of the arrow, disc 23 and the elements carried thereby will rotate with the rotor 16 but disc 18, since it is freely mounted on shaft 12, will remain stationary until the inner end of bell crank lever 34 contacts with pin 21. When this takes place a connection is established between disc 18 and shaft 12 with the consequent rotation of disc 18. However, due to the inertia of disc 18, spring 33 will at first be compressed somewhat and bell crank lever 34 will oscillate about its pivot to bring friction member 36 into gentle rubbing contact with the inner face of ring 38. The load imposed on the receiver rotor 16 at this time is very slight and does not substantially interfere with its normal operation. The contact of element 36 with the inner face of ring 38 is but momentary for as soon as disc 18 attains the speed of shaft 12, spring 33 will again expand to oscillate bell crank lever 34 in the opposite direction until it contacts with pin 37 and thus carry friction element 36 back to the position shown in Fig. 5. During the rotation of the receiver rotor 16 in the direction assumed, pin 20 does not come into contact with bell crank lever 27, consequently friction inset 28 is maintained out of contact with the inner face of ring 38 by spring 26.

If it is assumed that the receiver rotor 16 starts to rotate in the opposite direction, pin 20 will contact with bell crank lever 27 to carry inset 28 into gentle contact with the inner face of ring 38 against the force exerted by spring 26. After the momentary contact, spring 26 will again expand and carry friction element 28 away from ring 38. During this time pin 21 will not come into contact with bell crank lever 34 and friction inset 36 will not be moved.

When the rotor 16 of receiver 2 approaches the position corresponding with that of the rotor of transmitter 1, it will slow down rapidly as will disc 23, but disc 18, because of the momentum acquired, will continue to rotate at substantially the same speed as previously thereby causing pin 21 to move away from bell crank lever 34 and pin 20 to move toward bell crank lever 27. Since at this time the difference in speed between discs 18 and 23 is great, pin 20 will strike bell crank lever 27 with considerable impact causing it to compress spring 26 and oscillate bell crank lever 27 about pin 29 to suddenly offer friction element 28 to the contact of the inner face of ring 38. The contact between friction element 28 and the inner face of ring 38 is a snubbing contact, the positions of the elements, as well as the effect on friction element 28, being shown in Fig. 6 of the drawings, with the result that a considerable load is suddenly placed on shaft 12. This results in substantially completely stopping rotor 16 of the receiver 2. The reaction of the impact together with the pressure of spring 26 is effective to reverse the direction of rotation of disc 18 and since disc 23 is stationary, or substantially so at this time, pin 21 will contact with bell crank lever 34 to compress spring 33 and oscillate bell crank lever 34 about its pivot 35 thereby bringing friction element 36 in contact with the inner face of ring 38, as shown in Fig. 7, to apply a further load to the rotor 16. In the usual case, the two applications of loads, just mentioned, are sufficient to bring rotor 16 to a dead stop. However, in cases where the mass of the rotating member is very great in proportion to the loads applied, more than two applications of load may take place before complete stopping of the rotating member.

With the preferred embodiment of the invention just described, the rotor 16 of the receiver 2 is brought to a complete stop without oscillation, within a fraction of a revolution of the point at which the initial checking load is applied. A more sudden stopping may be obtained by further separating pins 20 and 21, or if a more gradual stopping is desired, pins 20 and 21 may be brought closer together.

Referring now particularly to Figs. 8 to 11:
Bracket 15 has fixed thereto by means of threaded studs 40, a ring member 41 which encircles the discs 42 and 43. Discs 42 and 43 are similar to discs 18 and 23 respectively and are mounted relative to bracket 15 and shaft 9 in a similar manner as the last mentioned discs are mounted relative to receiver 2 and shaft 12. Disc 43 is pinned to shaft 9 by means of a pin 44 and is provided with an arcuate slot 45 through which project pins 46 and 47 carried by inertia disc 42.

A cam lever 48 pivoted on pin 49 is carried by disc 43 and lies between cam elements 50 and 51 which are in turn pivoted respectively on pins 52 and 53, carried by disc 43. Each of cam elements 50 and 51 has fixed thereto a pin 54. These pins 54 serve as anchors for tension spring 55 which maintains cam elements 50 and 51 in constant contact with cam lever 48. Pins 56 and 57 fixed to disc 43 adjacent cam members 50 and 51 respectively, limit the movement of these cam members away from the inner face of ring 41. Cam members 50 and 51 are shaped to accommodate insets 58 and 59 of cork or other friction material, which, upon movement of cam lever 48, contact with the inner face of ring 41 to apply a checking load to shaft 9 and through gear train 8 to shaft 7 of the rotor of transmitter 1.

Figure 9:
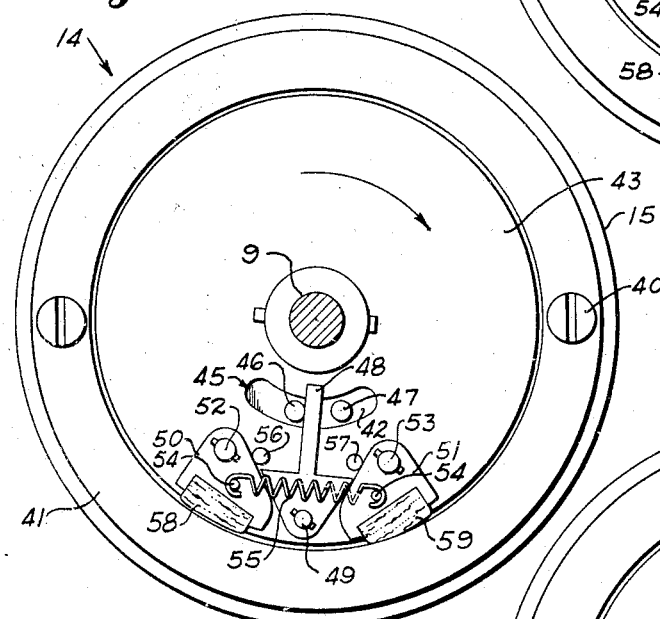
Figs. 9 and 10 are views similar to Fig. 8 showing the positions assumed by the parts of the checking mechanism during the sudden starting of the transmitter rotor due to the closing of the energizing circuit of the system.

When switch 6 is moved to close the circuit of the rotors of transmitter 1 and receiver 2, the transmitter rotor as well as the receiver rotor, unless they are in corresponding positions, will rotate. When such rotation of the rotor of transmitter 1 takes place, disc 43 being fastened to shaft 9 rotates also but disc 42, since it has no direct connection to shaft 9, remains stationary. When disc 43 has moved through an angular distance about equal to one half the angular distance between pins 46 and 47, cam lever 48 will collide with pin 46, assuming that the rotation is in the direction indicated by the arrow in Fig. 9. Since disc 42 has appreciable inertia, cam lever 48 will be oscillated about pivot 49 and in turn will oscillate cam member 51 about pivot 53 to carry friction member 59 into sudden snubbing contact with the inner face of ring 41, as shown in Fig. 9, thus suddenly applying a load to the shaft 9 and to the rotor of transmitter 1.

Figure 10:
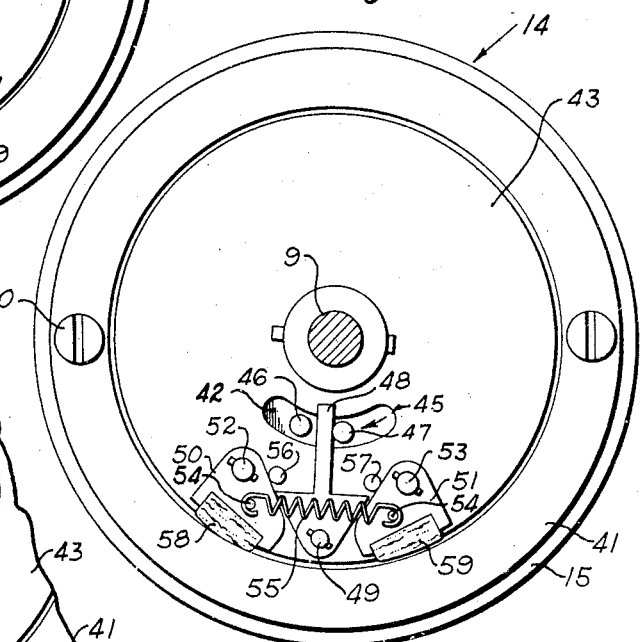
Figure 11:
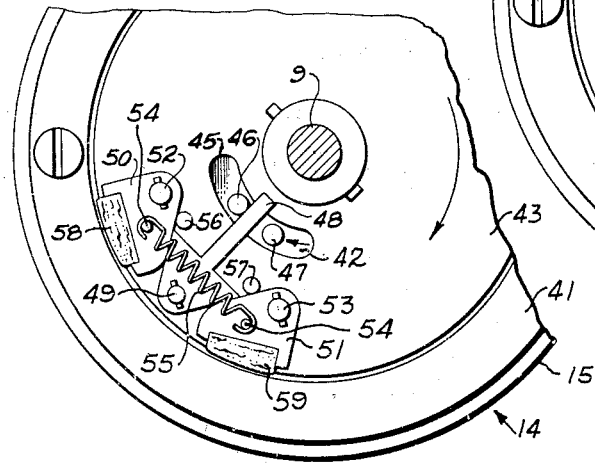
Fig. 11 is a view similar to Fig. 8 showing the positions assumed by the parts of the checking mechanism during normal rotation of the transmitter.

Due to the reaction from the collision and the pull exerted by spring 55, disc 42 will be set in motion and friction member 59 carried away from contact with ring 41. As the load applied is effective to substantially stop shaft 9. gear train 8 and the rotor of transmitter 1, disc 42 will rotate relative to disc 43 and after moving through an angular distance somewhat less than the distance between pins 46 and 47, pin 47 will collide with cam lever 48. This time cam lever 48 will oscillate to cause friction member 58 to contact with the inner face of ring 41, as shown in Fig. 10, to apply a load which is effective to stop disc 42. After the alignment movement of receiver 2 is completed, as is usually the case when the second load mentioned is applied, the rotor of transmitter 1 no longer tends to rotate and spring 7 will return the elements of the mechanism to the positions occupied in Fig. 1.

In the normal operation of transmitter 1 the rotor thereof is started comparatively slowly so that in its initial travel it does not attain a high speed, consequently, the collision between cam lever 48 and pin 46 or pin 47 is not violent and does no more than cause a slight oscillation of cam lever 48 without causing contact of friction member 58, or friction member 59, with the inner face of the ring 41. After the initial collision the elements of mechanism 14 occupy the positions shown in Fig. 11.

The preferred embodiment of the invention just described is very sensitive and will apply the checking load to the rotor of transmitter 1 upon movement of said rotor through a very small angle. The angle through which the rotor of transmitter 1 must move before the checking loads are applied may be increased or diminished as desired by properly proportioning gear train 8. The same result may be had, though the change in sensitiveness is not as great, by changing the spacing of pins 46 and 47 and/or varying the spacing between insets 58 and 59 and ring 41. By changing the characteristic of spring 55, it may be made to operate at different starting conditions of the rotor mentioned.

While preferred embodiments have been shown and described, it is understood that the invention may be embodied in other forms, and various changes may be made without departing from its principle as defined in the appended claims. For instance, the embodiment shown in Figs. 2 to 7 inclusive is particularly adapted for use in checking the movement of the armature of a servomotor to which it may be applied in a manner similar to that shown in connection with the rotor of the Selsyn receiver in the above mentioned figures.

I claim:

1. In apparatus of the character described having a rotatable shaft, the combination of a disc mounted on said shaft for rotation therewith and having an arcuate slot cut therein, an inertia disc mounted on said shaft for independent rotation having means extending therefrom projecting through said slot, a fixed ring member encircling said shaft and discs, contact means pivoted on said first disc, and means normally holding said contact means out of contact with said ring member, said means extending from the inertia disc being effective to move said contact means into contact with said ring member when the discs rotate relative to each other.

2. In apparatus of the character described having a rotatable shaft, the combination of a disc mounted on said shaft for rotation therewith and having an arcuate slot cut therein, an inertia disc mounted on said shaft for independent rotation and having a plurality of pins extending therefrom and projecting through said slot, a fixed ring member encircling said shaft and discs, pivoted means on said first disc, contact means movable by said pivoted means upon oscillation thereof, resilient means normally holding said contact means out of contact with said ring member, said pins being effective upon relative movement of said discs to oscillate said pivoted means to thereby move said contact means into contact with said ring member whereby a rotation checking load is applied to said shaft.

3. In a receiver having a rotor shaft and a casing adapted for inclusion in an electrical system of the character described, the combination of a disc mounted on said shaft for rotation therewith and having an arcuate slot cut therein, an inertia disc mounted on said shaft for independent rotation, a ring member fixed to said casing and encircling said shaft and discs, bell crank levers pivoted on said disc proximate each end of said slot, said levers having one end thereof overlying said slot and the other end adjacent said ring member, friction insets in the other end of each of said levers, resilient means contacting with said one end of each of said levers and exerting a force tending to oscillate said levers to carry said other ends away from said ring member, means limiting the movement of said levers away from said ring member, and a pair of spaced pins fixed to said inertia disc and extending through said slot, one of said pins being effective upon relative movement of the discs in one direction to oscillate its adjacent lever to bring its friction member into contact with the ring member and the other of said pins being effective upon relative movement of the discs in the other direction to oscillate its adjacent lever to bring its friction member into contact with the ring member.

4. In combination with a transmitter having a rotor and adapted for inclusion in an electrical system of the character described, a shaft, means connecting said rotor and shaft for proportional rotation, a disc mounted on said shaft for rotation therewith and having an arcuate slot cut therein, an inertia disc mounted on said shaft for independent rotation, a fixed ring member encircling said shaft and discs, a pair of friction cam members pivoted on said first disc one on one side of a radius passing through the center of said slot and the other on the other side thereof, said cam members each having a friction face disposed adjacent said ring member, a cam lever pivoted on said first disc disposed between said cam members and having one end overlying said slot, resilient means attached to each of said cam members exerting a pull tending to keep said cam members in contact with said cam lever and out of contact with said ring member and a pair of pins on said inertia disc extending through said slot one on one side of said one end of said lever and the other on the other, one of said pins being effective upon sudden relative movement of said discs in one direction to oscillate said lever to move one of the cam members into contact with the ring member and the other of said pins being effective upon sudden relative movement of said discs in the other direction to oscillate said lever to move the other of the cam members into contact with the ring member.

5. In a mechanism of the character described, the combination of a plurality of elements mounted for relative movement, one being adapted to be driven and another having individual free bodily movement with respect to the driven element, disengageable means on the respective elements movable in a predetermined path, said means being yielding in part and engageable to effect a driving relation from one to the other of said elements for unitary movement thereof when the first mentioned element is being normally driven, and co-acting friction means controlled by relative movements of said elements and said connecting means in consequence of a less than normal speed of the driven element and the inertia of said other element to apply a check to the movement of said driven element.

6. In a mechanism of the character described, the combination of an element adapted to be driven, a freely mounted weight element, a braking-surface furnishing element, said elements being coaxially mounted for relative rotation, with freedom from direct mutual engagement, yielding friction-applying means and actuating means therefor mounted respectively on the first and second named elements for normal unitary rotation and for response to variation in the speed of the former and the inertia of the latter to apply a braking effort to said brake-surface-furnishing element.

7. In a mechanism of the character described, the combination of coaxially mounted relatively rotatable elements, one being adapted to be driven and the other being freely mounted individually to be influenced by its inertia, a braking-surface member coaxial with said elements, impingement means carried by said inertia element, and contact mechanism carried by said driven element and operable by said impingement means upon relative rotary movement of said first two named elements to retardingly engage the braking surface of said member.

8. In a mechanism of the character described, the combination of coaxially mounted relatively rotatable elements, one being adapted to be driven and the other being freely mounted to be influenced by its inertia, a braking-surface member with respect to which said elements are relatively rotatable, displaceable contact means carried by one of said elements, yielding means normally retaining said contact means out of engagement with said member, and actuating means for said contact means carried by said other element, and operable upon relative movement of said elements to cause said contact means to retardingly engage said braking surface member.

9. In apparatus of the character described, the combination a rotatable shaft adapted to be driven, an element fixedly mounted on said shaft for rotation therewith, a second element freely rotatively mounted on said shaft to be influenced by its own inertia, a braking-surface member, movable contact means carried by one of said elements pressure-exerting means normally urging said elements out of contact with said member, and means on the other of said elements to move said contact means into contact with said member operable upon relative movement of said elements due to change of speed in and the inertia of the first and second named elements.

10. In apparatus of the character described having a rotatable shaft, the combination of a member mounted on said shaft for rotation therewith, an inertia member mounted on said shaft for independent rotary movement having means extending therefrom to be movable in an arcuate path relatively to said first named member, a brake ring member encircling said shaft and members, contact means pivoted on said first member, and means normally holding said contact means out of contact with said ring member, said means extending from the inertia member being effective to move said contact means into contact with said ring member when the first two named members move rotatively relatively to each other.

11. In apparatus of the character described having a rotatable shaft adapted to be driven, the combination of a disc fixedly mounted on said shaft for rotation therewith, an inertia disc freely mounted on said shaft and permanently free from a driving relation therewith and for independent rotary movement about said shaft in either of opposite directions, a fixed brake member encircling said shaft and discs, contact means pivoted on one of said discs, means holding said contact means out of contact with said member when said shaft is rotating at a normal speed and when it is at rest, and means on the other of said discs operative upon relative movement of said discs due to the change of speed and the inertia of the respective discs to move said contact means into contact with said member.

12. In apparatus of the character described having a rotatable shaft adapted to be driven, the combination of a disc fixedly mounted on said shaft for rotation therewith, an inertia disc freely mounted on said shaft and permanently free from a driving relation therewith and for independent rotary movement about said shaft in either of opposite directions, a fixed brake member encircling said shafts and discs, contact means pivoted on said first disc, means holding said contact means out of contact with said member when said shaft is rotating at a normal speed and when it is at rest, and means on the second disc operative upon relative movement of said discs due to the change of speed and the inertia of the respective discs to move said contact means into contact with said member.

13. In a mechanism of the character described, the combination of a plurality of movable elements rotatively supported for relative movement, one being adapted to be driven and to accelerate and decelerate at the beginning and terminating of its propulsion and another settable into motion by the first specified element and possessing inertia during said accelerating and decelerating periods, and retardation means for the first specified element comprising a stopping member, impingement means pivotally mounted on said first specified element, resilient force-applying means acting on said impingement means to normally retract the latter from said member, said impingement means being angularly operable by the second mentioned element upon relative movement of both named elements due to the changes of speed of the one and the inertia of the other to engage said member.

14. In a mechanism of the character described, the combination of a rotatable element adapted to be driven a fixed member having a braking surface, brake mechanism carried by said element comprising pivoted friction-applying means, resilient force-applying means acting on said friction-applying means to urge the latter away from the braking surface of said member, inertia-supplying means, and actuating means for said friction-applying means connected to said inertia-supplying means the inertia of the last mentioned means cooperating with variation in the rate of rotation of said element to apply said friction-applying means to said braking surface.

LEMUEL M. STUART.